(12) United States Patent
Malmström et al.

(10) Patent No.: US 7,489,431 B2
(45) Date of Patent: Feb. 10, 2009

(54) ELECTROCHROMIC DEVICE

(75) Inventors: Anna Malmström, Norrköping (SE); David A. Nilsson, Vikingstad (SE)

(73) Assignee: Acreo AB, Kista (SE)

( * ) Notice: Subject to any disclaimer, the term of this patent is extended or adjusted under 35 U.S.C. 154(b) by 0 days.

(21) Appl. No.: 11/979,777

(22) Filed: Nov. 8, 2007

(65) Prior Publication Data
US 2008/0130086 A1 Jun. 5, 2008

(30) Foreign Application Priority Data
Nov. 8, 2006 (EP) .................................. 06123694

(51) Int. Cl.
*G02F 1/15* (2006.01)
*G02F 1/153* (2006.01)
(52) U.S. Cl. ..................... 359/265; 359/269; 359/270; 359/273; 359/275
(58) Field of Classification Search .......... 359/265–275
See application file for complete search history.

(56) References Cited

U.S. PATENT DOCUMENTS 6,587,250 B2 7/2003 Armgarth et al.

2002/0134980 A1 9/2002 Armgarth et al.

OTHER PUBLICATIONS

European Search Report for corresponding application.
David Nilsson et al. "Electrochemical Logic Circuits." Advanced Materials. Wiley-Vch, Weinheim, Germany, No. 3, Feb. 10, 2005, pp. 353-358.
Peter Andersson et al. "Active Matrix Displays Based on All-Organic Electrochemical Smart Pixels Printed on Paper." Advanced Materials. Wiley-Vch, Weinheim, Germany, vol. 14, No. 20, Oct. 16, 2002, pp. 1460-1464.

*Primary Examiner*—William C. Choi
*Assistant Examiner*—Jack Dinh
(74) *Attorney, Agent, or Firm*—Harness, Dickey & Pierce, P.L.C.

(57) ABSTRACT

An electrochromic device is disclosed, including two electrochromic elements, which are switched in a time separated manner. Each electrochromic element is arranged of electrochemically active material, and connected to a counter layer by a solidified electrolyte. In at least one embodiment, the electrochromic device further includes at least one resistive device which restricts the electrochemical reaction of one of the electrochromic element, such that a color of this electrochromic element is not substantially altered until the other electrochromic element is reacted to a predetermined extent.

38 Claims, 4 Drawing Sheets

ELECTROCHROMIC DEVICE

FIELD OF THE INVENTION

The present invention relates to electrochromic display devices, and in particular to electrochromic display devices comprising an electrically conducting, electrochromic elements and at least one layer of solidified electrolyte, as well as two or more electrodes for connection to an electric voltage supply.

BACKGROUND OF THE INVENTION

Electrochromic materials exhibit color changes or changes in optical density as a result of electrochemical reduction and/or oxidation reactions. An electrochromic material can either be present as a solid, or exist as molecular, neutral or ionic species in an electrolyte solution. These materials have been used for the creation of electrochromic cells, where the passage of electric charge causes color changes in the materials. Electrochromic cells are used in electrochromic devices of different kinds, and two principal categories of these devices can be distinguished. The two categories differ from each other mainly in the arrangement of the elements of the electrochromic cell.

The first category of electrochromic devices utilizes a sandwich construction, and is used in applications such as automobile windows, building windows, sunglasses, large billboards, mirrors with variable reflectance, sunroofs etc. In this type of electrochromic device, continuous layers of electrochromic material and electrolyte (as well as other layers of e.g. ion reservoir material) are confined between two electrodes that completely cover the layers of electrochromic material and electrolyte. For the, electrochromic device to be of use, at least one of said electrodes has to be transparent to let light through the device. This requirement is met in the prior art through the use of electrode materials such as indium-doped tin oxide (ITO), tin dioxide or fluorine-doped tin dioxide. The electrochromic materials used in these applications vary, but are often based on heavy metal oxides such as $WO_3$ or conducting polymers such as polyaniline or polypyrrole. The conducting, electrochromic polymer poly-(3,4-ethylendioxythiophene) (PEDOT) has attracted much study, and sandwich devices incorporating this polymer have been realized.

The second category of electrochromic devices aim at providing an electrically updateable display for realization on a flexible support. U.S. Pat. No. 6,587,250, describes such a display, comprising an electron conducting material, an electrochromic material, two electrodes and a solidified electrolyte. This display allows the electrochromic material to be addressed via the electrolyte, so that the electrode architecture is not limited by the requirement that the electrodes of the voltage supply should be in direct electrical contact with the electrochromic material for electrochromic effects to occur. Such displays have the advantages of being cheap to manufacture, environmentally friendly, and possible to manufacture using conventional manufacturing processes such as printing techniques.

Matrix addressing of electrochromic pixel devices are known in the art, and can be used to control the switching of two displays, which are spatially separated from each other, such that the first display changes color at a first instance in time, and the second display changes color at a second instance in time, wherein the two instances are separated by a time difference sufficiently large for a viewer to perceiving a delay between the first and the second color change.

SUMMARY OF THE INVENTION

An object of the present invention is to provide at least one alternative way of providing the above described time separated or delayed switching of spatially separated electrochromic displays. The above object is achieved by a device as defined in claims 1, 24 and 32. Preferred embodiments are defined in the dependent claims.

The invention is based on a realization by the inventors that the combined change in color and resistance of electrochromic materials at electrochemical reactions thereof can be utilized to provide a low-cost and reliable device and method which enables a time separated switching of two or more spatially separated electrochromic elements or displays.

According to a first aspect there is provided an electrochromic device comprising a first charge carrier path having a first electrode which is electronically connected to a first electrochromic element or electrochromic layer. This element or layer is ionically connected by or via a first portion of solidified electrolyte to an adjacent first counter element or counter layer portion, which counter element or counter layer is electronically connected to a second electrode. Further, said first electrochromic element or layer and said first counter element or layer portion are electronically separated from each other. Moreover, a second charge carrier path is provided which comprises a third electrode electronically connected to a second electrochromic element or electrochromic layer. This element or layer is ionically connected by or via a second portion of solidified electrolyte to a second counter element or counter layer portion, which counter element or layer is electronically connected to a fourth electrode. Further said second electrochromic element or layer and said second counter element or layer is electronically separated from each other. Said second and fourth electrodes may be one and the same or separate electrodes, and said elements or layers are all arranged of electrochemically active material. Moreover, resistance means is arranged between said third and fourth electrodes, preferably in series with said second electrochromic layer and said second counter layer.

Said first path is electrically connected to said second path at an interface located between said first electrochromic layer and said resistance means, such that an electric current may flow both between said first and fourth electrodes and between said third and fourth electrodes. In other words, at said interface the potential of said first and second paths, respectively, are equal, or said first and second paths have a the same potential at said interface. Moreover, said first and second electrodes are arranged to receive a first potential difference across said first path, said third and fourth electrodes are arranged to receive a second potential difference across said second path, and said resistance means is arranged such that in an initial state an electrochemical reaction of said second electrochromic element or layer is restricted or prevented while an electrochemical reaction of said first electrochromic element or layer is enabled, such that said first electrochromic element or layer is electrochemically reacted at a higher rate or to a larger extent compared to said second electrochromic element or layer. Said electrochemical reaction of said first electrochromic element or layer changes the color and increases the resistance thereof, such that the potential at said interface increases until a substantially increased electrochemical reaction of said second electrochromic element or layer is effectuated, which changes the color thereof.

In other words, in a switched state of said first electrochromic element or layer said second electrochromic element or layer is electrochemically reacted at a substantially higher rate or to a substantially larger extent compared to in said initial state; due to a change in potential at said common interface.

In relation to this document said second and fourth electrodes may be one and the same, alternatively, they may be spatially separated from each other. Further, said second and fourth electrodes may have a common interface, and may be two portions of a common material or layer, which portions may be located adjacent to each other. Similarly, the first and third electrodes may be arranged as described in relation to said second and fourth electrodes.

According to a first embodiment said first and second portions of solidified electrolyte are two different portions of a common electrolyte layer, wherein said portions preferably have a common interface. According to another embodiment said first and second portions of solidified electrolyte are two layers of electrolyte which are ionically separated from each other.

According to one embodiment, said first and second electrochromic elements may be formed of different materials, such that the color of said first electrochromic element is different from the color of said second electrochromic element; either in the initial state and/or in the switched state.

In relation to this document, a charge carrier path is an arrangement of one or several material, through which a current of charge carriers, i.e. electrons and/or ions, may flow when a suitable potential difference is arranged across said material(s). This carrier path may comprise capacitive element. Normally, at least a first portion of the charge carrier path has a high electronic conductivity and low ionic conductivity; and at least a second portion of the charge carrier path has a high ionic conductivity and a low ionic conductivity, such that the flow of charge carriers along a charge carrier path is an alternating combination of electrons and ions.

When the interface, to which both said first and second electrolyte is connected, is arranged of e.g. electrolyte located in contact with said first electrochromic element or layer, the spatial location of the interface may move or get displaced with the extent of the electrochemical reaction of said first electrochromic element or layer.

In relation to this document, the electrochromic element corresponds to the area of the electrochemically active material which change color in response to the electrochemical reaction. In other words, the electrochromic element normally corresponds to the area of an electrochromic material which is in ionic contact with, or covered by, the electrolyte which ionically connects the electrochromic layer to said counter layer.

Said resistance means may be arranged of the same material as said electrochromic element, but may also be made of a different material having a different resistance. If said resistance means are arranged of a material having the same resistance as the electrochromic material, this material is preferably arranged in a winding fashion or as meanders in order to save space.

According to one embodiment, said first portion of electrolyte is in direct physical contact with both a portion of said first electrochromic element and a portion of said second electrochromic element.

According to one embodiment, the potential applied to said third electrode is more equal the potential applied to said first electrode, compared to the potential applied to said second and fourth electrode, respectively. Further, the potential applied to said fourth electrode is more equal the potential applied to said second electrode compared to the potential applied to said first and third electrode, respectively. Preferably, the potential applied to said first electrode is substantially equal to the potential applied to said third electrode, and/or the potential applied to said second electrode is substantially equal to the potential applied to said fourth electrode. When equal potentials are applied to two electrodes, these electrodes may be arranged as a continuous element, which facilitates the manufacturing of the electrodes and the application of the potential.

According to one embodiment, the potential applied to said second and fourth electrode, respectively is substantially higher than the potential applied to said first and third electrode, respectively. Further, said first potential difference is preferably substantially equal to said second potential difference.

According to one embodiment, the said first and second potential difference is substantially high such that the color of said respective first and second electrochromic elements is altered after a desired time delay.

According to one embodiment, said first potential difference is between 1 and 20 V, preferably between 1 and 10 V, more preferably between 1 and 7 V, and most preferably between 2 and 7 V.

According to one embodiment, said first electrochromic element is electrochemically reacted to a first extent, such that the color of said first electrochromic element is substantially altered at a first instance in time, and said second electrochromic element is electrochemically reacted to the same extent at a later instance in time. In other words, said first electrochromic element is reacted to said first extent at a first instance in time and said second electrochromic element is reacted to the same extent at a second instance in time, wherein the time difference between said first and second instances of time is preferably at least 300 milliseconds, more preferably at least 500 milliseconds, yet more preferably at least 1 second and most preferably at least 2 seconds. This is advantageous as the alteration of the first and second electrochromic element occurs with a sufficient time separation such that the eye may perceive the delay between the two instances of switching.

According to one embodiment, in said initial state the potential drop between said interface and said third electrode is at least 10 times, preferably at least 100 times, and more preferably at least 500 times, higher than the potential drop between said interface and said first electrode. This facilitates achieving a desired time separation between a respective switch of the two electrochromic elements, although e.g. the same potential difference is applied between said first and second electrodes as between said third and fourth electrodes.

According to one embodiment, in said initial state or at least at the same moment said first and second potential differences are applied, the potential drop along said second carrier paths from said fourth electrode to said first electrochromic material is at least 10 times, preferably at least 100 times, and more preferably at least 500 times, higher than the potential drop between along said first carrier path from said second electrode to said first electrochromic element. This facilitates achieving a desired time separation between a respective switch of the two electrochromic elements, although e.g. the same potential difference is applied between said first and second electrodes as between said third and fourth electrodes.

According to one embodiment, said electrochromic elements and said counter elements are formed as layers, which preferably are carried by a substrate. More preferably, said layers are arranged in a common plane on a substrate.

According to a second embodiment, said first and second portions of solidified electrolyte forms a continuous layer, which continuous layer ionically connects both said first and second electrochromic elements to said first and second counter elements. Further, said resistance means is preferably formed of solidified electrolyte, arranged between said second electrochromic element and said interface. Preferably, said resistance means comprises at least a part of said second portion of electrolyte. According to this embodiment also said first and second counter layers preferably forms a continuous layer of electrochemically active material.

According to one embodiment, said first electrochromic element is arranged between said second electrochromic element and said counter layers. Preferably, said first electrochromic element embraces said second electrochromic element from said counter elements, such that said second electrochromic element is separated from said counter layer(s). In other words, said first electrochromic element at least partially circumscribes said second electrochromic element. Optionally, said one of said counter layers may embrace said first or second electrochromic layers. These embodiments comprising embracing elements are advantageous as they provides a spatially more homogenous change of color of said first and second electrochromic elements.

According to one embodiment, said first and second counter elements forms a continuous layer. This is advantageous as it is facilitates the manufacturing of the device.

According to an alternative embodiment, said first and second portions of electrolyte are ionically separated from each other. Further, said resistance means is arranged between said first electrochromic material and said fourth electrode, as well as between said second counter material and fourth electrode. Moreover, at least one of said electrochromic elements further comprises an electrochromic delay portion.

According to a second aspect there is provided an electrochromic device comprising a first pixel having a first electrochromic layer and a first counter layer electronically separated from each other, and a first solidified electrolyte, which ionically connects said first electrochromic layer and said first counter layer, wherein said counter layer is electronically connected to a first gate electrode and said electrochromic layer electronically connects a first source electrode to a first drain electrode. Further, said electrochromic device comprises a switch portion arranged electronically between said source electrode and said drain electrode, which switch portion is in direct ionic contact with said solidified electrolyte.

For embodiments where the two color changing elements are connected to the same potential of said resistance means, the color changing elements do not necessarily have to be configured as described herein, i.e. comprising electrolyte and electrochemically active material, but may be any element which alters its color and resistance in response to an applied voltage.

Said electrochromic device further comprises a second pixel having a second electrochromic layer and a second counter layer, electronically separated from each other, and a second solidified electrolyte, which ionically connects said second electrochromic layer and said second counter layer, wherein said second counter layer is electronically connected to a second gate electrode and said second electrochromic layer electronically connects a second source electrode to a second drain electrode.

Moreover, said electrochromic device further comprises resistance means arranged between and electrically connected to a first contact portion and a second contact portion, and wherein said first drain electrode is connected to said second gate electrode and both said first and second drain electrodes are connected to said first contact portion of said resistance means.

Further, said source and gate electrodes of said first pixel are arranged to receive and maintain a first voltage difference or potential difference; and said source electrode of said second pixel and said second contact portion of said resistance means are arranged to receive and maintain a second voltage difference or potential difference. Said resistance means and said voltage differences or potential differences are so arranged that in an initial state an electrochemical reaction of said second electrochemical element is prevented or at least restricted and an electrochemical reaction of said first electrochemical element is enabled. In other words, in said initial state said first electrochromic element is electrochemically reacted at a higher rate compared to said second electrochromic element. The electrochemical reaction alters the color and increases the resistance of said first switch portion, such that the potential at a point between the drain electrode of said first pixel and the gate electrode of said second pixel increases. This increased potential effectuates an increased rate of the electrochemical reaction of said second electrochromic element, compared to rate of the electrochemical reaction of said second electrochromic element in said initial state. This electrochemical reaction alters the color of said second electrochromic element.

In more detail, said first contact portion of said resistance means, the drain electrode of said first pixel and the gate electrode of said second pixel are all connected to a common potential at an interface, or a point of intersection, e.g. at said first contact portion of said resistance means.

According to one embodiment said resistance means and said voltage differences are arranged such that in an initial state the potential drop is lower between said interface and said first electrode compared to between said interface and said third electrode, such that said first electrochromic layer is electrochemically reacted at a higher rate compared to said second electrochromic layer. As said electrochemical reaction changes the color and increases the resistance of said first switch portion, the flow of charge carriers between said second gate electrode and said second source electrode increases, such that said second electrochromic material is electrochemical reacted at a higher rate compared to in said in active state of said first switch portion.

According to one embodiment an electrochromic device is provided, wherein said second electrochromic element further comprises a switch portion arranged electronically between said second source electrode and said second drain electrode, which switch portion is in direct ionic contact with said second solidified electrolyte.

According to one embodiment said first pixel further comprises a delay reservoir comprising electrochromic and electrochemically active material, which is arranged electrically between said first counter portion and said first switch portion such that said first electrolyte ionically connects both said switch portion and said delay reservoir to said first counter portion, and wherein said first potential difference initiates an electrochemical reaction between said delay reservoir and said first counter portion.

Further, said first pixel further comprises means for maintaining a potential difference between said first switch portion and said first counter portion such that a front of said electrochemical reaction propagates in said delay reservoir until said front reaches said first switch channel, before said electrochemical reaction alters the electrical conductivity of said switch channel such that the resistance between said first source and drain electrodes is increased.

According to one embodiment said delay reservoir is arranged as a protrusion extending from said switch portion towards said first counter element, which protrusion separates said switch portion from said counter element. Hence, the delay reservoir is electronically connected to said switch portion.

According to one embodiment said delay reservoir is formed as a symbol.

According to one embodiment said first counter element embraces said first switch portion.

As stated above said first and or second pixel may comprise an electrochemical switch for delayed switching. In other words, said pixel comprises a source contact, a drain contact and a switch channel. The channel comprises electrochemically active material and is arranged to electrically connect said source contact to said drain contact. According to one embodiment said pixel further comprises a delay reservoir of electrochemically active material, which channel is arranged in contact with said switch channel. Preferably said delay reservoir is arranged of electrochromic material and is comprised in said first pixel element. Moreover, said pixel comprises a counter layer, and an electrolyte ionically connecting both said switch channel and said delay reservoir to said counter layer. Additionally, said electrochromic device comprises means for applying a potential across said electrolyte such that an electrochemical reaction between said delay reservoir and said counter layer is initiated. Said switch channel also comprises means for maintaining a potential across said electrolyte, such that a reaction front of said electrochemical reaction first propagates in said delay reservoir until said front reaches said switch channel, before said electrochemical reaction alters the electrical conductivity of said switch channel such that it switches.

The switch channel is preferably arranged between and in direct electrical contact with the source and drain contacts and comprises an organic material that has the ability of electrochemically altering the electrical conductivity in response to the electrochemical reaction. The delay reservoir is arranged such that it separates the switch channel from the counter layer and thereby prevents the switch channel from participating in the electrochemical reaction unless the delay reservoir is first electrochemically reacted to a predetermined extent.

In a sense, the delay reservoir serves as a buffer that protects the switch channel from participating in the electrochemical reaction. Hence, when a drive voltage is applied to a gate electrode electronically connected to the counter layer, the electrochemical reaction will be restricted to the delay reservoir, leaving the switch channel essentially unaffected until the delay reservoir is reacted to the predetermined extent. In other words, the electrical conductivity of the switch channel is normally maintained until it is altered by the electrochemical reaction initiated in the delay reservoir, which alteration occurs after the delay reservoir has been reacted to said predetermined extent. In yet other words, if a first electrical conductivity of the switch channel is provided, said delay reservoir preferably prevents said switch channel from switching at least until a front of said electrochemical reaction, propagating in said delay reservoir, reaches said switch channel. Hence, said first electrical conductivity is substantially maintained until said electrochemical reaction switches said switch channel. Moreover, said predetermined extent typically corresponds to the delay reservoir being more or less fully reacted. For example, the electrochemical reaction may first occur in a region of the delay reservoir close to the counter layer and may subsequently extend gradually in a direction towards the switch channel. According to this example, the switch channel is essentially unaffected until the reaction front reaches the switch channel.

In effect, depending on its electrochemical state, the switch channel provides electrical contact between the source and drain contacts or isolates them electrically from each other, i.e. provides low electrical conductivity between said source and drain contacts, and the delay reservoir serves to delay an electrochemical reaction initiated in said delay reservoir from occurring in the switch channel. Thereby the switch channel operates as a timer switch by altering its electrical conductivity only after a predetermined time delay, that is equal to the time it takes for the delay reservoir to react electrochemically to the predetermined extent defined above.

According to one aspect the display device comprises two delay reservoirs of electrochromic material, which are separated by a switch portion, and arranged such that a flow of charge carriers are substantially increased to said second delay reservoir when the conductivity of the switch portion is altered due to an electrochemical reaction thereof.

With respect to this document, the term switching of an electrochemically active material refers to a substantial alteration or change of the electrical conductivity of said material, i.e. that the electrical conductivity is altered by at least 50%, and preferably more. In other words, if the switch channel has an electrical conductivity of 0.1 S/cm, it is considered to have been switched if the conductivity of the switch channel is changed to 0.05 S/cm or less, and to 0.15 S/cm or more, respectively.

A switching of said switch channel is different from the change in electrical conductivity which might occur when a potential is initially applied across the electrolyte of a timer switch, and which effectuates the formation of an electric field across said switch channel for the first time. With respect to this document, the switch channel has an initial conductivity before said potential is applied across said electrolyte. It is believed that as the potential is applied, the electrical conductivity of the switch channel might change slightly, from said initial electrical conductivity to a first electrical conductivity. If this change in conductivity occurs, said first electrical conductivity is believed to be reached shortly after a first electric field has stabilized across said switch channel, as a response to said potential which is applied across said electrolyte. The change in said electrical conductivity is usually between 1% and 10% compared to the initial electrical conductivity, provided it occurs. With respect to this document, the term initialization phase refers to the time interval during which this change of electrical conductivity possibly occurs, and the electric fields effecting the display or switch are stabilized. The duration of the initialization phase is short and normally in the order of milliseconds. However, it is more likely that this change of electrical conductivity will occur for an electrochemically active material which is in its conducting state, than for one which is in its non-conducting state. With respect to this document, if no change occurs said first conductivity equals said initial conductivity of said switch channel.

Whether a front of said electrochemical reaction starts propagating in said delay reservoir towards said switch channel, before said first electrical conductivity of said switch channel is provided, or vice verse, (i.e. whether a first electrical conductivity of said switch channel is provided before said front of said electrochemical reaction starts propagating in said delay reservoir towards said switch channel), is determined by the specific choice of electrochemically active material for said switch channel, said delay reservoir in combination with the choice of electrolyte.

As have been stated above, the delay reservoir serves to delay switching of the switch channel a substantial amount of time. However, once the switch channel switches, the electrical conductivity thereof changes rapidly and substantially.

Hence, switching of a pixel provided with a delay reservoir can be divided into two phases, a delay phase and a switching phase. During the delay phase, the electrochemical reaction is restricted to the delay reservoir and does not essentially affect the switch channel. During the switching phase, the electrochemical reaction works primarily on the switch channel and thereby changes the electrical conductivity of the switch channel in a step-like fashion. Consequently, the delay time is normally substantially longer than the switching time. The ratio between the delay time and the switching time is typically 10:1 or higher. According to one embodiment, the ratio is at least 100:1. The existence and magnitude of this ratio is, in a sense, what gives the timer device its fundamental timer characteristic. In comparison, a transistor device is designed to switch as quickly as possible and the existence of anything similar to a delay phase would deteriorate its performance completely.

The delay reservoir can be defined as the portion of the electrochemically active element whose electrical conductivity does not essentially affect the overall conductivity between the source and drain contacts. The switch channel can be defined as the remaining portion of the electrochemically active element, whose electrical conductivity essentially affects the conductivity between the source and drain contacts.

The change of electrical conductivity occurring in the switch channel can be either a change from low to high conductivity or a change from high to low conductivity, depending on the design of the device and on the materials used, provided that not only the conductivity but also the color of the delay reservoir is altered. The switch thus either opens or closes an electrically conductive link between the drain contact and the source contact. This opening or closing occurs after a predetermined time delay that is governed by the delay reservoir. In operation, the gate electrode is simply connected to a voltage supply that gives rise to electrochemistry occurring in the delay reservoir.

As is obvious for the skilled man, the entire electrochemically active element, including the switch channel, might participate in the electrochemical reaction to some minor extent even before the delay reservoir is sufficiently electrochemically reacted or reacted to said predetermined extent. However, any such participation is below the degree of electrochemical reaction needed to substantially change the conductivity of the switch channel. A substantial change in color is to be determined as a change in color that is clearly visible for a human eye, or a change in contrast of about 10 when measured according to CIE (Commision Internationale d'Eclairage) LAB. According to one example an unswitched pixel has a LAB value of about 65 and a completely switched a LAB value about 45. A substantial change in color can also be determined by measuring the change in conductivity. For example, the conductivity of the switch channel may change <5% before the delay reservoir sufficiently reacted, and may change tens or hundred of times once the threshold is reached. As stated above, a substantial change of color may therefore to be interpreted as an alteration of the electrical conductivity of at least 50%, and preferably as a substantially larger alteration such as of at least 1,000% or at least 10,000%.

According to one embodiment, the provided time delay provided is thus based on an initial electrochemical reaction confined to one delay reservoir. In order to improve the operation, it is found advantageous to use an electrolyte that has a lower ionic conductivity than the electronic conductivity of the delay reservoir. Moreover, it is preferred to use an electrolyte that has a substantially lower ionic conductivity than the electronic conductivity of the electrochromic element in most embodiments. In this context, the ionic conductivity of the electrolyte should be interpreted as ionic charge carrying capacity, whereas the electronic conductivity of the delay reservoir should be interpreted as electronic charge carrying capacity. Using such a low conductivity electrolyte, the electrochemical reaction will occur in a reaction front, traveling from the edge nearest the counter layer towards the switch channel. Hence, according to one embodiment the electrochromic element possibly comprising the delay channel has a first electronic electrical conductivity, and the electrolyte has an ion electrical conductivity that is lower than the electron electrical conductivity of the electrochromic element, such that the electrochemical reaction is forced to occur gradually in a reaction front traveling in said electrochromic element from said gate electrode towards said switch channel. Basically, in such a device, the reaction front will travel in the electrochromic element towards the switch channel at the same speed that essentially all of the electrochromic element material behind the reaction front is "consumed" by the electrochemical reaction on its way towards the switch channel. In other words, the reaction front will travel at a speed substantially equal to the rate at which all of the delay reservoir material behind the reaction front is "consumed". This effect is caused by the charge carriers, driving the electrochemical reaction, preferring to travel in the electrochromic element rather than in the electrolyte, and thereby preferring to perform electrochemistry as close to the counter layer as possible. However, when the material closest to the counter layer is consumed the charges gradually have to travel a longer distance in the electrolyte. In fact, the bigger the difference in charge carrying capacity the more distinct the front will be.

The above reasoning applies also to arrangements where the electrolyte is included in the electrochemically active material. In this context, an electrolyte should be interpreted as a media that is ion conductive. Some materials provide for both ion conductivity and electron conductivity and hence do not require any separate electrolyte to be applied.

According to one embodiment, the electrolyte is arranged in a layer on the counter layer and the electrochromic layer. This is advantageous, for example, in case printing techniques are employed as mentioned above. In such case, the electrolyte can be selectively applied in a separate or parallel manufacturing step using the same or similar equipment. The thinner this layer of electrolyte is made, the lower the total ionic conductivity of the electrolyte, which is preferable in order to achieve a larger difference between the ionic conductivity of the electrolyte and the electrical conductivity of the electrochromic element.

Alternatively, the electrolyte can be arranged as an integral part of the counter layer and the electrochromic element, for example in the form of electrolyte particles dispersed in a polymer matrix of the respective components. This is advantageous for some applications since it eliminates the need for a separate electrolyte to be applied, thereby simplifying manufacture by eliminating a manufacturing step. However, the counter layer and the electrochromic element should preferably be bridged by a material that conducts ions much better than electrons in order to promote an electrochemical reaction. Most preferably, said electrolyte should conduct ions but not electrons.

According to this document, the delay reservoir can be interpreted as the part of the electrochemically active region whose electrical conductivity does not affect the electrical conductivity between the source and drain contacts. The delay reservoir typically has a substantially larger volume than the switch channel, thereby ensuring a substantial delay time and also a relatively short response time in the switch channel once the electrochemical reaction has progressed through the delay reservoir to the switch channel. According to some embodiments, the volume ratio between the delay reservoir and the switch channel is at least 10:1, 100:1, 1000:1, or 10000:1.

Furthermore, the electrolyte should preferably have a restricted ion conductivity thereby slowing down the electrochemical reaction and thus lengthening the delay time.

When the electrolyte is arranged such that it does not cover the whole of the electrochromic element, an electrochemical reaction initiated in said electrochromic element will propagate mainly in the portion of said electrochromic element which is in contact with said electrolyte. However, the front of the electrochemical reaction will normally also spread into surrounding portions of said electrochromic element, which are not covered by any electrolyte. In most cases, the propagation rate of the front of said electrochemical reaction is faster in the portion of an electrochemically active element which is covered by said electrolyte, compared to in a portion of an electrochemically element which is not covered by electrolyte.

A first and a second pixels are compared. The only difference between the two pixels is that the electrolyte of said first pixel covers the whole of said delay reservoir, whereas the electrolyte of said second pixel only covers half of said delay reservoir. The electrolyte of said first and said second pixel, respectively, both extends continuously from said counter layer to said switch channel. In operation, the front of the electrochemical reaction propagating in the delay reservoir of said second pixel will reach its respective switch channel faster, than the front of said electrochemical reaction propagating in the delay reservoir of said first pixel will reach its respective switch channel.

In a device that provides for an electrochemical reaction front as described above, the extent to which the delay reservoir has to be electrochemically reacted before any electrochemical reaction occurs in the switch channel essentially corresponds to the electrochemical reaction front reaching the switch channel. In other words, the switch switches once the electrochemical reaction front traveling or propagating in the delay reservoir reaches the switch channel. As the electrochemically active element comprises electrochromic material that changes optical appearance upon electrochemistry the electrochemical reaction front is visible, and thereby gives an optical readout of the position of the reaction front. Hence, it is possible to follow the progress of the reaction front and to anticipate the switching of the switch channel.

The electrochemical reaction occurring in the electrochromic element can be either a reduction or an oxidation, provided that the color of the element is altered in response to the reaction. Hence, according to one embodiment, the electrochromic element has the ability of altering its color and electrical conductivity through reduction thereof. According to an alternative embodiment, the electrochromic element has the ability of altering its color and electrical conductivity through oxidation thereof.

As stated above, the switch channel comprises a material having the ability to electrochemically altering its color and electrical conductivity. The material can, for example, be an electrically conductive polymer suitable for application through conventional printing processes. The electrically conductive polymer might be a polymer, a copolymer, or mixture of polymers, and can optionally comprise additional, non-organic compounds such as metallic particles. Alternatives to electrically conductive polymers include various metal oxides and other molecules that can be switched between a low-conducting state and a high-conducting state.

Even though the delay reservoir is electrochemically active as well as electrochromic, it does not necessarily have the ability of electrochemically altering its electrical conductivity. However, the delay reservoir and the switch channel are both part of the electrochromic element and are therefore conveniently formed out of the same material.

Furthermore, according to yet one embodiment, the source and drain contacts and the electrochromic elements are formed as an integral unit by one and the same material.

The use of electrically conductive polymers is advantageous in that they are easy to process and thus enable, for example, conventional printing techniques to be used for creating the respective components. According to one embodiment, the first and second electrochromic layers or layer portions and said first electrode are all arranged in one common plane and carried by a substrate. This arrangement is particularly advantageous since it enables roll-to-roll printing techniques and thereby makes possible large-scale, low-cost manufacturing. To further simplify manufacturing the counter layer and said second electrode can be formed out of electrically conductive polymer as well, thereby enabling the same manufacturing method to be used for the counter layer as well. Hence, according to one embodiment, the counter layer is formed out of an electrically conductive polymer. That polymer is advantageously the same polymer used for first electrode and the electrochromic layers.

Preferably, said switch channel, said delay reservoir, said counter layer and said electrodes are all formed of a respective layer comprising electrochemically active material, which layers are arranged on a carrier substrate.

As described above, the electrochemical reaction is driven by a voltage applied to said counter layer. The polarity thereof depends on the desired electrochemical reaction. A positive counter layer voltage gives rise to reduction in the electrochromic element, and a negative voltage gives rise to oxidation in the electrochromic element.

The provided electrochromic device is advantageous since it provides a low-cost, dependable authentication device that can be used in combination with, for example, different types of logic circuits (e.g. based on electrochemical transistors), and various battery cells. In fact, it is particularly advantageous since it can be manufactured using the same equipment and materials as used for manufacturing electrochemical transistors and displays etc.

According to one aspect the present invention is based on the use of electrically conductive polymers that are patterned, cut or formed to a desired configuration. Hence, in a sense, it is the pattern or shape of the polymer in combination with the electrolyte that defines characteristics of the electrochromic device. This is advantageous since it facilitates straightforward tuning of the characteristics simply by changing the layout of the polymer pattern.

Another advantage is the ability to arrange additional sets of switch channels and drain contacts, each such set having individual switching characteristics. Hence, two switch channels can, for example, be arranged in series such that a first of them is totally switched before the electrochemical reaction continues to the second switch channel. In such case, the first switch channel may in effect operates as an extension of the delay reservoir in respect to the second switch channel.

DEFINITIONS

Electrochromic element: an "electrochromic element" in relation to this document is a continuous geometrical body, which can be patterned to different shapes, and is composed of one material or a combination of materials. The material(s)

may be organic or inorganic, molecular or polymeric. Such an electrochromic element, whether it is composed of one material or is an ensemble of more than one material, combines the following properties: at least one material is electrically conducting in at least one oxidation state, and at least one-material is electrochromic, i.e. exhibits color change as a result of electrochemical redox reactions within the material.

Solidified electrolyte: for the purposes of this document, "solidified electrolyte" means an electrolyte, which at the temperatures at which it is used is sufficiently rigid that particles/flakes in the bulk therein are substantially immobilized by the high viscosity/rigidity of the electrolyte and that it doesn't flow or leak. In the preferred case, such an electrolyte has the proper rheological properties to allow for the ready application of this material on a support in an integral sheet or in a pattern, for example by conventional printing methods. After deposition, the electrolyte formulation should solidify upon evaporation of solvent or because of a chemical cross-linking reaction, brought about by additional chemical reagents or by physical effect, such as irradiation by ultraviolet, infrared or microwave radiation, cooling or any other such. The solidified electrolyte preferably comprises an aqueous or organic solvent-containing gel, such as gelatine or a polymeric gel. However, solid polymeric electrolytes are also contemplated. Furthermore, the definition also encompasses liquid electrolyte solutions soaked into, or in any other way hosted by, an appropriate matrix material, such as a paper, a fabric or a porous polymer. In some embodiments, this material is in fact the support upon which the electrochromic device is arranged, so that the support forms an integral part of the operation of the electrochromic device.

Electrodes: "electrodes" in devices according this document are structures that are composed of an electrically conducting material. Such electrodes allow the application of an external voltage to the electrolyte layer(s), whereby an electric field within the solidified electrolyte layer is sustained for a time period long enough for the desired color changes to occur. Electrodes in some devices according to this document are distinct from the continuous layers of electrode material covering continuous sheets of electrochromic material and electrolyte that can be found in sandwich structures of the prior art. Rather, they form patterns in one or more planes in the layered structure of the present electrochromic device.

Layer: the laminate structure of the device according to this document consists of "layers" of different materials. These layers can be continuous or patterned, and be applied to each other (self-supporting device) or to a support (supported device). Furthermore, the term layer is intended to encompass all of the same material in the same plane, regardless whether this material is patterned or interrupted in such a way as to form discontinuous "islands" in the plane.

Direct electrical contact: Direct physical contact (common interface) between two phases (for example electrode and electrolyte) that allows for the exchange of charges through the interface. Charge exchange through the interface can comprise transfer of electrons between electrically conducting phases, transfer of ions between ionically conducting phases, or conversion between electronic current and ionic current by means of electrochemistry at an interface between for example electrode and electrolyte or electrolyte and electrochromic element, or by occurrence of capacitive currents due to the charging of the Helmholtz layer at such an interface.

Dynamic device: in certain embodiments of this document, a "dynamic device" is provided. The colour change in the electrochromic element(s) in such a device is reversed upon removal of the external voltage.

Bi-stable device: in certain embodiments of this document, a "bi-stable device" is provided. The effects of a colour change in the electrochromic element(s) in such a device remain after removal of the external voltage.

Colour change: when reference is made to "colour change", this is also meant to include changes in optical density or reflectance, so that "colour change" for example takes into account changes from blue to red, blue to colorless, dark green to light green, grey to white or dark grey to light grey alike.

Materials

Preferably, the solidified electrolyte comprises a binder. It is preferred that this binder have gelling properties. The binder is preferably selected from the group consisting of gelatine, a gelatine derivative, polyacrylic acid, polymethacrylic acid, poly(vinyl-pyrrolidone), polysaccharides, polyacrylamides, polyurethanes, polypropylene oxides, polyethylene oxides, poly(styrene sulphonic acid) and poly (vinyl alcohol), and salts and copolymers thereof; and may optionally be cross-linked. The solidified electrolyte preferably further comprises an ionic salt, preferably magnesium sulphate if the binder employed is gelatine. The solidified electrolyte preferably further contains a hygroscopic salt such as magnesium chloride to maintain the water content therein.

In some embodiments, the electrochromic element comprises, as electrochromic material, an electrochromic polymer which is electrically conducting in at least one oxidation state, and optionally also comprises a polyanion compound. Electrochromic polymers for use in the electrochromic element of the electrochromic device are preferably selected from the group consisting of electrochromic polythiophenes, electrochromic polypyrroles, electrochromic polyanilines, electrochromic polyisothianaphthalenes, electrochromic polyphenylene vinylenes and copolymers thereof, such as described by J C Gustafsson et al in Solid State Ionics, 69, 145-152 (1994); Handbook of Oligo- and Polythiophenes, Ch 10.8, Ed D Fichou, Wiley-VCH, Weinhem (1999); by P Schottland et al in Macromolecules, 33, 7051-7061 (2000); by M Onoda in Journal of the Electrochemical Society, 141, 338-341 (1994); by M Chandrasekar in Conducting Polymers, Fundamentals and Applications, a Practical Approach, Kluwer Academic Publishers, Boston (1999); and by A J Epstein et al in Macromol Chem, Macromol Symp, 51, 217-234 (1991). In one embodiment, the electrochromic polymer is a polymer or copolymer of a 3,4-dialkoxythiophene, in which said two alkoxy groups may be the same or different or together represent an optionally substituted oxy-alkylene-oxy bridge. In one embodiment, the electrochromic polymer is a polymer or copolymer of a 3,4-dialkoxythiophene selected from the group consisting of poly(3,4-methylene-dioxythiophene), poly(3,4-methylene-dioxythiophene) derivatives, poly(3,4-ethylenedioxythio-phene), poly(3,4-ethylenedioxythiophene) derivatives, poly(3,4-propylene-dioxythiophene), poly(3,4-propylenedi-oxythiophene) derivatives, poly(3,4-butylenedioxythio-phene), poly(3,4-butylenedioxythiophene) derivatives, and copolymers therewith. The polyanion compound is then preferably poly(styrene sulfonate). As is readily appreciated by the skilled man, in alternative embodiments, the electrochromic material comprises any non-polymer material, combination of different non-polymer materials, or combination of polymer materials with non-polymer materials, which exhibit conductivity in at least one oxidation state as well as electrochromic behavior. For example, one could use a composite of an electrically conducting material and an electrochromic material, such as electrically conductive particles such as tin oxide, ITO or ATO particles with polymer or non-polymer electrochromic materials such as polyaniline, polypyrrole, polythio-phene, nickel oxide, polyvinylferrocene, polyviologen, tungsten oxide, iridium oxide, molybdenum oxide and Prussian blue (ferric ferrocyanide). As non-limiting examples of electrochromic elements, mention can be made of: a piece of PEDOT-PSS, being both conducting and electrochromic; a piece of PEDOT-PSS with $Fe^{2+}/SCN^-$, PEDOT-PSS being conducting and electrochromic and $Fe^{2+}/SCN^-$ being an additional electrochromic component (see below); a piece composed of a continuous network of conducting ITO particles in an insulating polymeric matrix, in direct electrical contact with an electrochromic $WO_3$-coating; a piece composed of a continuous network of conducting ITO particles in an insulating polymeric matrix, in contact with an electrochromic component dissolved in an electrolyte.

As described above, some embodiments comprise a further electrochromic material for realization of devices with more than one colour. This further electrochromic material can be provided within the electrochromic element or the solidified electrolyte, which then for example comprises an electrochromic redox system, such as the redox pair of colorless $Fe^{2+}$ and $SCN^-$ ions on one hand, and of red $Fe^{3+}$ $(SCN)(H2O)_5$ complex on the other. By way of further, non-limiting example, such materials may be selected from different phenazines such as DMPA-5,10-dihydro-5,10-dimethylphenazine, DEPA-5,10-dihydro-5,10-diethylphenazine and DOPA-5,10-dihydro-5,10-dioctylphenazine, from TMPD-N,N,N',N'-tetramethylphenylenediamine, TMBZ-N, N,N',N'-tetra-methylbenzidine, TTF-tetrathiafulvalene, phenanthroline-iron complexes, erioglaucin A, diphenylamines, p-ethoxychrysoidine, methylene blue, different indigos and phenosafranines, as well as mixtures thereof.

The support in some embodiments of the electrochromic device is preferably selected from the group consisting of polyethylene terephthalate; polyethylene naphthalene dicarboxylate; polyethylene; polypropylene; paper; coated paper, e.g. coated with resins, polyethylene, or polypropylene; paper laminates; paperboard; corrugated board; glass and polycarbonate. The support is also preferably reflective.

Generally, all terms used in the claims are to be interpreted according to their ordinary meaning in the technical field, unless explicitly defined otherwise herein. All references to "a/an/the [element, device, component, means, step, etc]" are to be interpreted openly as referring to at least one instance of said element, device, component, means, step, etc, unless explicitly stated otherwise. Other objectives, features and advantages of the present invention will appear from the following detailed disclosure, from the attached dependent claims as well as from the drawings.

BRIEF DESCRIPTION OF THE DRAWINGS

The above, as well as additional objects, features and advantages of the present invention, will be better understood through the following illustrative and non-limiting detailed description of preferred embodiments of the present invention, with reference to the appended drawings, wherein the same reference numerals are used for similar elements.

DETAILED DESCRIPTION OF PREFERRED EMBODIMENTS

Figures 1A, 1B:
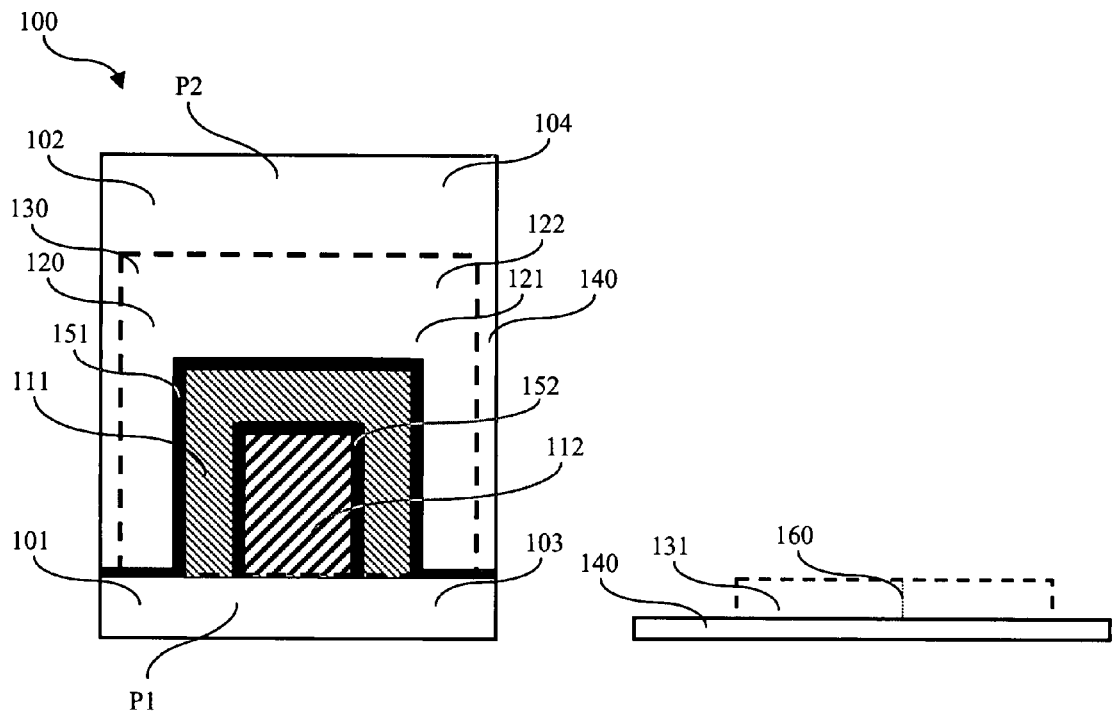
FIG. 1A is a schematic top view of a first embodiment.
FIG. 1B is a schematic cross-sectional view indicating a common interface in an electrolyte.

FIGS. 1*a* and 1*b* schematically illustrates a first embodiment. According to this embodiment an electrochromic device 100 is provided comprising a first electrochromic element or a first electrochromic layer 111, and a second electrochromic element or a second electrochromic layer 112. A counter layer or a counter layer portion 121 of electrochemically active material is also provided, and the first electrochromic element 111 is arranged spatially between said second electrochromic layer 112 and said counter layer 121. Preferably said first electrochromic layer embraces said second electrochromic layer 112, such that said second electrochromic layer 112 is spatially separated from said counter layer 121. There is also provided a first portion of solidified electrolyte 131, which ionically connects said counter layer 121 to said first electrochromic layer 111; and a second portion of solidified electrolyte 132 which ionically connects said first portion of electrolyte to said second electrochromic layer 112, wherein said first and second portions 131, 132 of electrolyte preferably are arranged as a continuous layer 130 which covers at least a portion of each of said first electrochromic layer 111, said second electrochromic layer 112, and said counter layer 121. Said first and second electrochromic element 111, 112 and said counter layers 121, 122 are arranged of electrochemically active material. Here, only the portions 111, 112 of said electrochemically active material which are in ionic contact with said electrolyte is referred to as an electrochromic element. Normally, this substantially corresponds to the portions 111, 112 of said electrochromic material covered by electrolyte.

Said first and second electrochromic elements are spatially and electronically separated from each other by isolating means 152. The isolation means can e.g. be provided by arranging an isolating material between said layer, such as an over-oxidized portion of electrochromic material or of a different material compared to said electrochromic material, or by removing the material which initially connects said first electrochromic element to said second electrochromic element, when these according to one embodiment are formed from a continuous layer. Further, said first electrochromic layer 111 is electronically separated from said counter layer 121, by e.g. isolating means 151.

According to the embodiment of FIG. 1A, said first and third electrodes 111, 112 are formed as a continuous layer to which a first potential P1. According to another embodiment said first and third electrodes may be electronically separated, and the potential applied to the first electrode may be different compared to the potential applied to the third electrode. According to the embodiment of FIG. 1A said first and second counter layers 121, 122 forms a continuous layer to which a second potential P2 is applied.

Initially, the interface 160 between a first current path and a second current path is a cross section of said electrolyte 130 located approximately above the outermost portion of said first electrochromic layer 111, i.e. approximately above the line separating said first electrochromic layer 111 from the surrounding counter layer. As the outermost area of the first electrochromic layer 111 is electrochemically reacted said interface 160 is moved towards said second electrochromic layer 112, until it is located approximately above the innermost portion of said first electrochromic layer 111.

In other words, the potential difference P2–P1 is sufficiently high to initiate an electrochemical redox reaction between said counter layer 121 and said first electrochromic layer 111. The initiated electrochemical reaction alters the color and increases the resistance of said first electrochromic element. This increased resistance alters of the potential field of the electrolyte such that the potential at said interface between the electrolytes is raised. In response to this alteration of the potential field in the electrolyte, the rate of the electrochemical reaction of second electrochromic element will increase, such that the color is substantially altered. In other words, initially the impedance of said first electrochromic material is lower than the impedance of said second portion of electrolyte and said second electrochromic element. Hence, in said initial state said first electrochromic layer is reacted at a higher rate compared to said second electrochromic layer.

According to one embodiment said electrochromic element 100 is manufactured by providing a sheet 140 of electrochromic and electrochemically active material. A portion of said sheet 140 is over-oxidized such that the electronic conductivity thereof is substantially reduced. Preferably, a first over-oxidized continuous uncrossed line 151 is provided, which extends across said sheet 140 from one side of said sheet to the other. The line 151 divides the sheet 140 in a first portion comprising said first and second electrochromic layers 111, 112 and preferably also a first and third electrodes 101, 103; and a second portion comprising said counter layer 121 and preferably a second and fourth electrodes 102, 104. Further, said sheet is provided with a second over-oxidized continuous line 152 which electronically separates said first electrochromic layer 111 from said second electrochromic layer 112. Said second line is preferably not closed, such that both said first and second electrochromic layers are in electronic contact with a continuous electrode. According to one embodiment, said line outlines the contour of a symbol, as in FIG. 1A where it outlines a square or in FIG. 1C where it outlines an arrow.

Figure 1C:
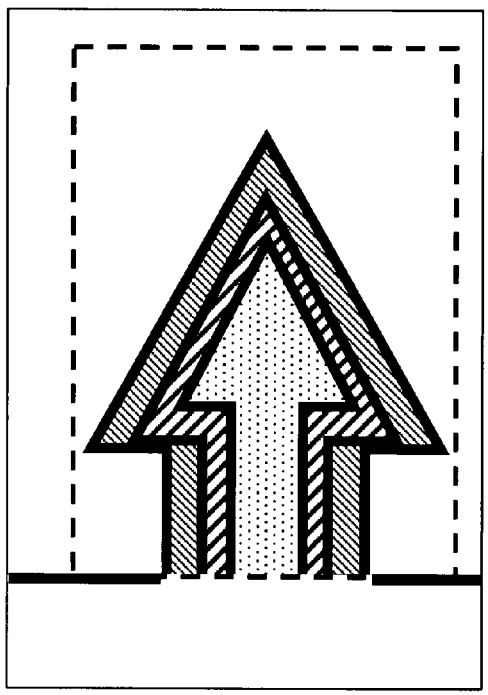
FIG. 1C is a schematic top view of a second embodiment.
Figure 1D:
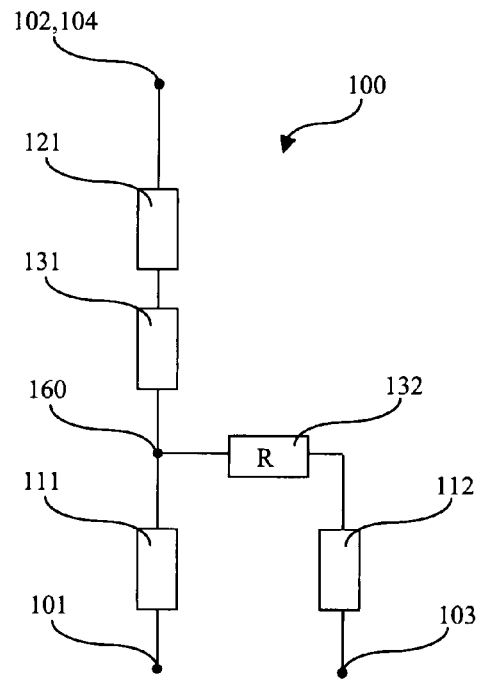
FIG. 1D is a schematic diagram of one generalisation of said first embodiment illustrated in FIG. 1A.

FIG. 1D describes an alternative representation of said first embodiment illustrated in FIGS. 1A and 1B, by means of a schematic circuit diagram. The electrochromic device 100 comprises a first charge carrier path, which comprises said first electrode 101, which is electronically connected to the first electrochromic layer 111, which is ionically connected by the first portion of solidified electrolyte 131 to an adjacent first counter layer portion 121, which is electronically connected to a second electrode 102, wherein said first electrochromic layer 111 and said first counter layer portion 121 are electronically separated from each other. The electrochromic device also comprises a second charge carrier path having a third electrode 103 which is electronically connected to the second electrochromic layer 112, which is ionically connected by the second portion of solidified electrolyte 132 to a portion of said counter layer 121, which is electronically connected to a fourth electrode 104, being adjacent to said second electrode 102. The electrochromic device further comprises resistance means 132 arranged between, i.e. electronically between said third and fourth electrode 103, 104. In this embodiment the resistance means comprises at least a part of said second portion of solidified electrolyte 132, bridging a separation between said first and second electrochromic layers. Moreover, said first path is electrically connected to said second path at a common interface 160 or cross section between or above said first and second portions of solidified electrolyte. In other words, said interface is located between said first electrochromic layer and said resistance means or said second electrochromic portion 132, such that electric current may flow both between said first and second electrodes and between said second and third electrodes.

Further, a first potential P1 is applied to both said first and possibly third electrode, and a second potential P2, which is different from P1, is applied to said second and possibly fourth electrode, such that that in an initial state an electrochemical reaction of said second electrochromic element is restricted while an electrochemical reaction of said first electrochromic element is enabled, as the potential difference between the intersection and said first electrode is lower compared to the potential difference between said intersection and said third electrode. Hence, said first electrochromic element 111 is electrochemically reacted at a higher rate compared to said second electrochromic element 112. Said electrochemical reaction of said first electrochromic element 111 changes the color and increases the resistance thereof, such that the potential at said common interface 160 increases until an substantially increased rate of the electrochemical reaction of said second electrochromic element is effectuated, which changes the color thereof. In other word, in said initial state more charge carriers will reach said first electrochromic layer 111 compared to said second electrochromic layer 112, and consequently said first electrochromic layer 111 will be electrochemically reacted to a larger extent or at a higher rate compared to said second electrochromic layer 112. The electrochemical reaction changes or alters the color and increases the resistance of said first electrochromic layer 111. As the resistance is increased, the amount of charge carriers which reaches said first electrochromic element will decrease, compared to the amount of charge carriers which at the same instance reaches said second electrochromic element, such that a substantially increased electrochemical reaction rate is achieved at said second electrochromic layer 112, which changes the color thereof.

According to one embodiment said electrochemically active material is PEDOT:PSS and formed as a sheet which according to one example is about 2.4 cm long and about 1.3 cm wide and about 0.2 μm thick, which is arranged on a support of PET (the thickness of which is 175 μm). Said layer of solidified electrolyte comprises an organic polymer in combination with a conductivity enhancing component i.e. a salt as well as surfactant, wetting and film forming agents; and is about 1.8 cm long, about 1.2 cm wide and about 50 μm thick wherein the electrolyte is arranged on top and in physical contact with said sheet of electrochemically active material.

FIG. 1C illustrates an alternative embodiment, wherein said first and second electrochromic layers each are arranged as an arrow. Further, said electrochemical device comprises a third electrochromic element, also arranged of electrochemically active material, which is embraced by said second electrochromic element and spatially separated there from. Further said third electrochromic element is in ionic contact with, and might be covered by said electrolyte, such that it is in ionic contact with said counter layers. Said third electrochromic element is also formed as an arrow. Naturally, also other shapes are possible. In effect, said third electrochromic element will in a time separated manner change color after said first and second electrochromic material has changed color.

Figure 2A:
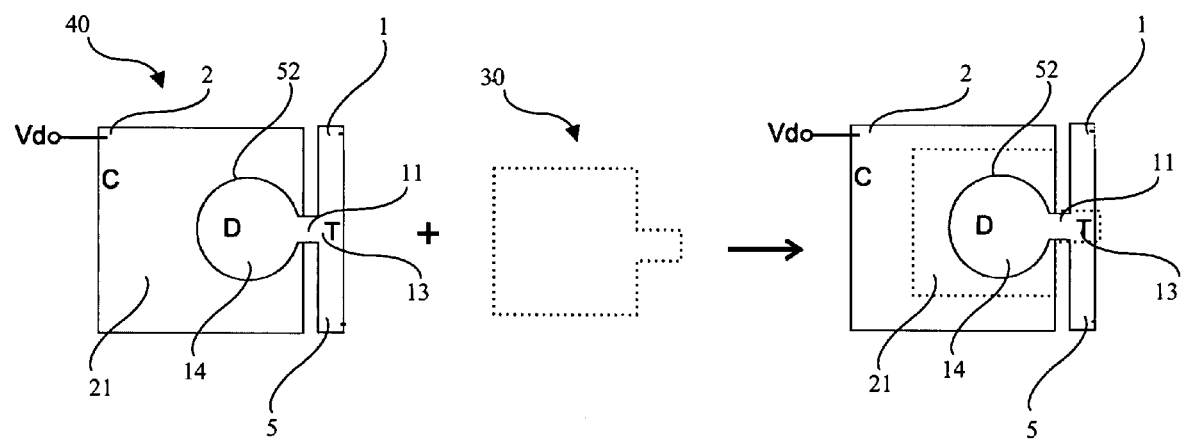
FIG. 2A is a schematic illustration of the arrangement of a pixel according to another embodiment.

FIG. 2A illustrates one embodiment of a pixel. The pixel comprises an electrochromic layer 11 which is electronically connected to a source electrode 1, and a drain electrode 5. Which of the electrodes that is source electrode and drain electrode, respectively, is strictly speaking determined by the applied potentials. Said electrochromic layer also comprises a switch portion 13 spatially and electrically arranged between said source and drain electrodes 1, 5. According to one embodiment said electrochromic layer has an elongated shape which extends between said source drain electrodes 1, 5. A counter layer 21 is arranged adjacent to and electronically separated from said electrochromic layer, and a solidified electrolyte 30 is arranged such that it ionically connects said counter layer 21 to said electrochromic layer 11 and the switch portion 13 thereof. Said electrolyte layer may cover said electrochromic layer 11, and is in direct physical contact therewith. Moreover, said counter layer is electronically connected to a gate electrode 2.

Optionally, said electrochromic layer further comprises a delay reservoir 14, having the shape of a symbol such as a dot, disc or a star, which reservoir 14 is electronically connected to said switch portion and is arranged between said switch portion 13 and said counter layer. Said counter layer 21 preferably embraces said delay reservoir 14, such that a homogenous color change of said reservoir is achieved.

According to one embodiment of a pixel, a continuous layer of electrochemically and electrochromic material comprises e.g. a rectangular shaped main portion, a smaller elongated portion and a bridging portion, which electronically connects said elongated portion to said main portion. An over-oxidized continuous uncrossed line 52 arranged in said main portion, starting and ending at said bridging portion, divides said continuous layer in two portions such that said electrochromic layer or electrochromic layer portion is electronically separated from said counter layer or counter layer portion. Said line 52 defines e.g. a symbol such as a disc or a star.

When a potential difference is applied across said electrolyte an electrochemical reaction is initiated which changes the color and increases the resistance of said electrochromic layer, i.e. of the switch portion and the delay reservoir if present. In other words, as the switch portion is electrochemically reacted the resistance between said source and drain electrodes is increased. Normally, the electrochemical reaction is initiated at the outer portion of said electrochromic element 14 close to said isolating means 52. Hence, the propagation rate of a front starting at the open portion of said isolating means and spreading towards the switch portion 13, will determine the delay before the switch portion 13 switches. In other words, by extending the bridging element 11 of said delay portion 14, the time until said switch portion switches will be increased.

Figure 2B:
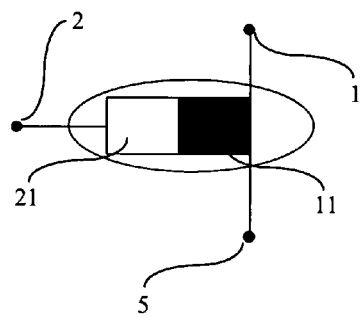
FIG. 2B is a symbol representing e.g. the pixel illustrated in FIG. 2A.

FIG. 2B corresponds to a proposed symbol for use in circuitry diagrams, corresponding to the right most device illustrated in FIG. 2A. The device is optionally provided with a delay reservoir 14 as described above.

Figure 2C:
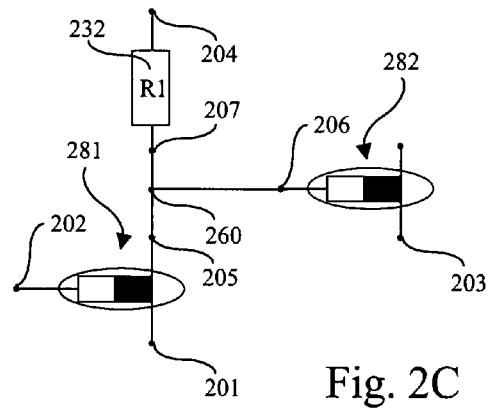
FIG. 2C is a schematic circuitry describing another embodiment.

FIG. 2C is a schematic illustration of a circuitry, wherein a first pixel 281 is switched before a second pixel 282 in a time separated manner. A first and a second pixel 281,282 is provided, each arranged as described in relation to FIG. 2A. The drain electrode 205 of said first pixel 281 and the gate electrode 206 of said second pixel 282 are connected to a first contact portion 207 of a first resistance means 232. Said first resistance means 232 is arranged between a first contact portion 207 and a second contact portion or a second electrode 204. In other words, a first charge carrier path is arranged between said first and second electrodes 201, 202, and a second charge carrier path is arranged between said third and fourth electrodes 203, 204. Moreover said first path is connected to said second path at a common interface 260 arranged electronically between a first electrochromic layer of said first pixel 281 and a first contact portion 207 of said resistance means. Hence, charge carriers may flow both between said fourth and first electrodes, and between said fourth and third electrodes.

Moreover, a first voltage difference or potential difference is provided between a source electrode 201 and a gate electrode 202 of said first pixel 281. A second voltage difference is arranged between a source electrode 203 of said second pixel 282 and said second contact portion or said second electrode 204. Hence, due to the common interface 160 between said first and second charge carrier path, a third potential difference between said first and third electrodes 201, 204 is also provided. The voltage differences and the resistance means are e.g. arranged such that in an initial state the potential drop is smaller between said interface 260 and said first electrode 201, compared to the potential drop between said interface 260 and said third electrode 203. Hence, initially the electrochromic material 211 of said first pixel 281 is electrochemically reacted to a larger extent and at a higher rate, compared to the electrochromic material 212 of said second pixel 282. The electrochemical reaction changes or alters the color and increases the resistance of said first electrochromic layer 211 and the switch portion 213. Due to this increased resistance the potential at said common interface 260 will increase, and more charge carrier will flow between said common interface and said electrochromic layer 212 of said second pixel. In an active state of said first switch portion 213 of said first pixel, the resistance between said source and drain electrodes 201, 205 is increased such that the rate of the electrochemical reaction is sufficiently increased to alter the color of said second electrochromic layer 212. In more detail, the potential of said second electrode is e.g. closer to said fourth electrode, compared to either said first or said third electrodes. The potential of said first electrode is closer to the potential at said third electrode compared to at either of said second and fourth electrode. The potential applied to said first electrode is e.g. substantially the same as the potential applied to said third electrode. Further, the potential applied to said second electrode is e.g. substantially the same as the potential of said fourth electrode. According to a further embodiment said fourth electrode is connected to said second electrode.

The applied potentials is e.g. maintained until the second pixel has switched.

Figure 3A:
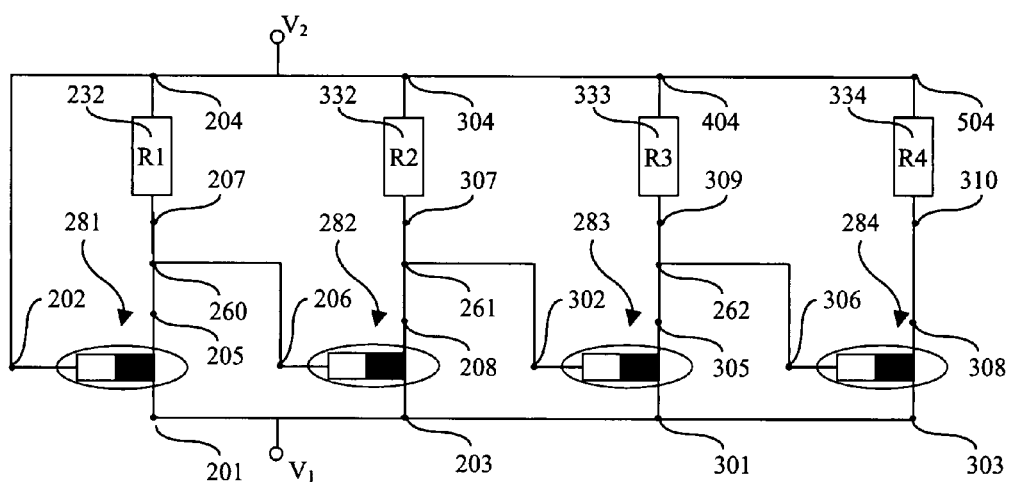
FIG. 3A is a schematic circuitry describing an additional embodiment.

FIG. 3A schematically illustrates a circuit diagram wherein four pixels are updated or switched in a time separated and sequential manner, such that the color of a first pixel 281 is substantially altered before the color of a second pixel 282, the color of which is substantially altered before the color of a third pixel 283, the color of which is substantially altered before the color of a fourth pixel 284 is altered in the same way. According to one embodiment, each of the pixels are arranged as described in relation to FIG. 2A.

A first and a second pixel 281, 282 and first resistance means R1 are arranged as described in relation to FIG. 2C. A drain electrode 208 of said second pixel 282, and a first contact portion 307 of a second resistance means R2 are both electronically connected to a gate electrode 302 of said third pixel, such that a second interface is provided 261. Further, a drain electrode 305 of said third pixel 283, and a first contact portion 309 of a third resistance means R3 are both electronically connected to a gate electrode 306 of said fourth pixel, such that a third interface is provided 262.

Four respective first potentials, are applied to a respective source electrode 201; 203; 301; 303 of said pixels 281, 282, 283, 284. Four respective second potentials are applied to a respective second contact portion 204; 304; 404; 504 of said resistance means R1; R2; R3; R4. Further, a third potential is applied to the gate electrode 202 of said first pixel.

Said potentials and said resistance means are e.g. arranged such that in an initial state the potential drop is smaller between said first interface 260 and said first electrode 201, compared to the potential drop between said first interface 260 and said third electrode 203. Further, the potential drop between said first and second electrodes 201, 202 is e.g. lower compared to the potential drop between said third and fourth electrodes 203, 204. The other pixels are arranged in a corresponding manner. Hence, initially the electrochromic material 211 of said first pixel 281 is electrochemically reacted to a larger extent and at a higher rate, compared to the electrochromic material of respective second, third and fourth pixel 282, 283, 284. The electrochemical reaction changes or alters the color and increases the resistance of said first electrochromic layer 211. Due to this increased resistance the potential at said first common interface 260 will increase, and more charge carrier will flow between said first common interface and the electrochromic layer of said second pixel 282. Eventually, this will increase the resistance between said source and drain electrodes of said second pixel 282, such that a switching or color alteration of said third pixel will be effectuated. Later yet, the resistance between said source and drain electrodes of said third pixel 283 is increased sufficiently due to another electrochemical reaction, such that a switching or color alteration of said fourth pixel will occur.

According to an alternative embodiment all or some of said resistance means R1-R4 are substantially equal in resistance, some or all of said source electrodes 201, 203, 301, 303 are connected to a first common potential V1, and some or all of said second contact portions 204, 304, 404, 504 are connected to a second common potential V2. The gate electrode 202 of said first pixel is e.g. also connected to said second common potential V2.

When the value of each resistance means is 10 kOhm, the ratio between the impedance of the switched transistor channel and the resistor is increased compared to when 200 kOhm is used. This results in that the potential at point 260 is higher for a fully switched channel when 10 kOhm is used compared to when if 200 kOhm is used. One drawback with using low values on the resistor is that the leakage current will increase. If the resistance is chosen such as a voltage drop of 1V is achieved over the transistor then one pixel will be switched for each voltage that is applied. In other words, if the voltage difference (V2−V1) is 3 V—three pixels will switch; and if the voltage difference is 4.5 V—four pixels will switch. The pixels will switch in a time separated manner.

Suitable potential differences and resistance values of the resistance means are determined by the materials used for said pixels. According to one embodiment said electrochemically active material is PEDOT:PSS. Said layer of solidified electrolyte comprises an organic polymer in combination with a conductivity enhancing component i.e. a salt as well as surfactant, wetting and film forming agents, and the electrolyte is arranged on top and in physical contact with said sheet of electrochemically active material. Further, the value of the respective resistance R1-R4 is about 150 kOhm, and in the unreacted state the resistance between the gate and source electrodes of each pixel is about 1 MOhm and the resistance between the drain and source electrodes of each pixel is about 3 kOhm. In other words, if the potential difference is 5V, the potential at 260 is initially about 0.1 V. At a fully switched state the resistance between said source and drain electrodes (R-channel) is 680 kOhm, when the applied potential (V2−V1) is 5V. Further, the potential at the interface 260 (P-260) is 4.1 V. The resistance of R1-R4 remain substantially the same.

The resistance between the source and drain electrodes at a fully switched state is for the current example dependent on the applied potential difference (V2−V1) in the following manner:

| V2-V1 | P-260 | R-channel (fully switched) |
|---|---|---|
| 5 V | 4.1 V | 680 kOhm |
| 4 V | 3.1 V | 515 kOhm |
| 3 V | 2.1 V | 350 kOhm |
| 2 V | 1.1 V | 180 kOhm |

Figure 3B:
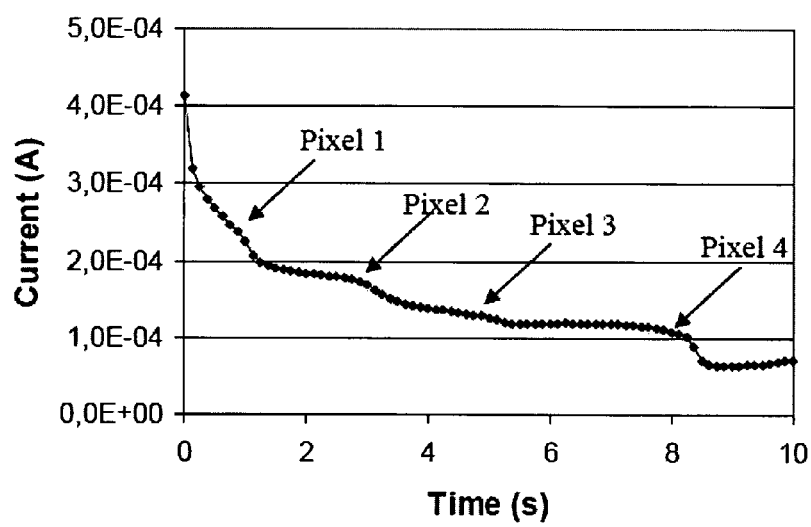
FIG. 3B is a diagram illustrating the result of a circuit measurement on a circuit as illustrated in FIG. 3A.

A current measurement of the arrangement illustrated in FIG. 3A is shown in FIG. 3B. The current is the total current measured for the circuit between V1 and V2. As can be seen in the diagram the current drops dramatically during the first second to about half of its initial value, until the first switch channel has switched, Pixel 1. Thereafter the current remains more constant during approximately two seconds, until the second switch channel has switched, Pixel 2. The current decreases further during approximately 2s, until the third switch channel switches, Pixel 3. After that the current only decreases slightly until the fourth switch channel has switched, Pixel 4.

Figure 3C:
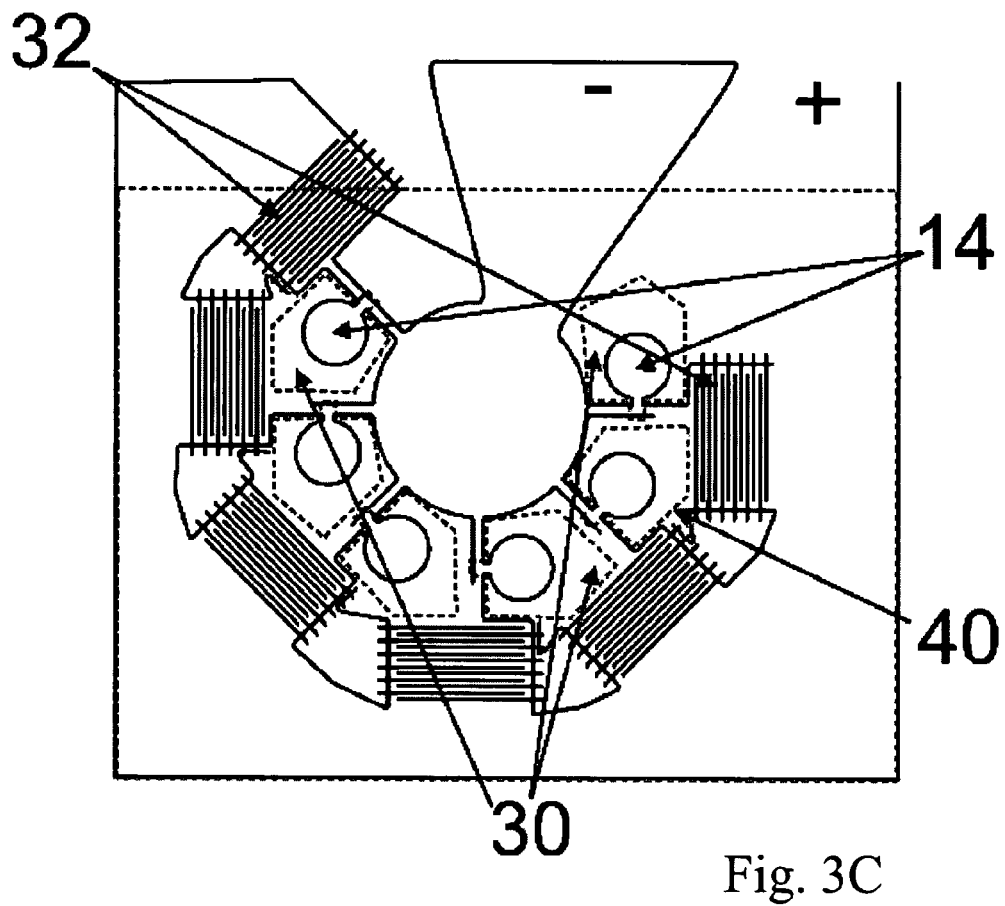
FIG. 3C is a schematic illustration of one realization of a circuitry as described in relation to FIG. 3B, but comprising two additional pixels.

FIG. 3C illustrates one embodiment of the circuitry shown in FIG. 3A, comprising six pixels, wherein the two additional pixels and two resistance means are arranged as continuations or repetitions of a portion of the circuitry shown in FIG. 3A. The resistance means, the electrochromic layers and the counter layers are defined by lines cut by a knife in a continuous layer of electronically conducting and electrochemically active material 40. These cuts are indicated by lines in FIG. 3C. Note that the outline of applied portions of electrolyte is indicated as a polygonal with dotted boarder. Six resistance means are arranged as meanders 32 defined by said straight lines. A first meander and a sixth meander are indicated in the Figure by a respective arrow 32. A first delay reservoir and as sixth reservoir are indicated in the Figure by a respective arrow 14. A first, fourth and sixth electrolyte are indicated by a respective arrow 30, each electrolyte has a polygonal shape. Each electrolyte covers a respective delay reservoir and a switch channel, as well as a portion of the surrounding counter layer. A negative potential is applied to a portion of said continuous electrochromic layer which is integrated with said the source portion or source electrolytes of said pixels. A positive potential is applied to a portion of said continuous layer which is integrated with said counter portions. The potential difference between said negative and positive voltages is, according to one embodiment, about 5 V. As the voltage is applied, one pixel switches at a time with a time difference of about 1 second, provided that the voltage is high enough. For example, if 6 V is needed to switch 6 pixels, and only 3 V is applied—only 3 pixels will switch. In other words, the circuitry can be used to measure or indicate the applied voltage.

As the voltage is removed, all the pixels switches back to their initial color, due to a reversed electrochemical reaction. If the voltage is turned on again, the pixels will again switch in a time separated manner.

Figure 4:
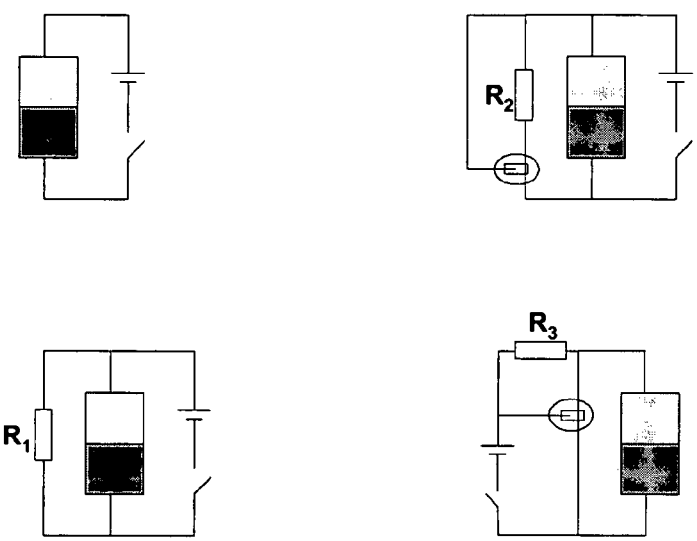
FIG. 4 is a schematic illustration of three ways of enhancing the decoloring or discharging of a pixel.

FIG. 4 illustrates three alternative ways of enhancing the discharging or decoloring of a pixel or an electrochromic element by connecting a transistor and/or resistance means in parallel therewith. The top left circuitry comprises a pixel of a bi-stable design, which ideally will not be discharged. In realty it will, due the leakage current. According to the bottom left circuitry the discharging is effectuated through a resistor, connected in parallel with said pixel. When the circuit is disconnected the display discharge through the resistor. There will of course be a leakage current through the resistor during update.

In the top right circuitry the discharging is achieved through a resistor and a transistor connected in series. The resistor increases the potential at the gate relative the channel of the transistor.

In the bottom right circuitry discharging is achieved through a transistor. The resistor increases the potential at the gate relative the channel of the transistor. In this configure, the pixel will not update until the transistor is switched because the transistor determines the potential over the display.

The present invention is has numerous application where the automatic time separated switching is utilized, e.g. as an attention attracting feature on a document or a package, or as a authenticity feature on a security document. In practice, when a sufficient voltage is applied the electrochromic device by connecting it to e.g. a battery or a solar cell, the color of the electrochromic elements will change sequentially.

The invention has mainly been described above with reference to a number of explicitly disclosed embodiments. However, as is readily appreciated by a person skilled in the art, other embodiments than the ones disclosed above are equally possible within the scope of the invention. For instance, the man skilled in the art knows that different materials can be used for the different electrochromic elements, or the configuration of the circuitry can be altered without departing from the scope of the invention.

The invention claimed is:

1. An electrochromic device comprising:
   a first charge carrier path having a first electrode electronically connected to a first electrochromic element, the first electrochromic element being ionically connected by a first portion of solidified electrolyte to an adjacent first counter element, the adjacent first counter element being electronically connected to a second electrode, wherein said first electrochromic element and said first counter element are electronically separated from each other;
   a second charge carrier path having a third electrode electronically connected to a second electrochromic element, the second electrochromic element being ionically connected by at least a second portion of solidified electrolyte to a second counter element, the second counter element being electronically connected to a fourth electrode, wherein said second electrochromic element and said second counter element are electronically separated from each other; and
   at least one resistance device arranged between said third and fourth electrodes and in series with said second electrochromic element and said second counter element,
   wherein each of said first and second electrochromic and first and second counter elements are arranged of electrochemically active material; wherein said first path is electrically connected to said second path at an interface located between said first electrochromic element and said at least one resistance device, such that electric current may flow both between said first and fourth electrodes and between said third and fourth electrodes; wherein said first and second electrodes are arranged to receive a first potential difference along said first path, said third and fourth electrodes are arranged to receive a second potential difference along said second path, and said potential differences and said at least one resistance device are arranged such that in an initial state said first electrochromic element is electrochemically reacted at a higher rate compared to said second electrochromic element, and
   wherein a second state the potential at said interface is sufficiently increased, by said increased resistance of said first electrochromic element, such that the rate of the electrochemical reaction at said second electrochromic element, which reaction changes a color thereof, is substantially relatively increased as compared to the rate in said initial state.

2. A device according to claim 1, wherein said first portion of electrolyte is in direct physical contact with both a portion of said first electrochromic element, and a portion of said second electrochromic element.

3. A device according to claim 1, wherein the potential applied to said first electrode is substantially equal to the potential applied to said and third electrode.

4. A device according to claim 1, wherein the potential applied to said second electrode is substantially higher than the potential applied to said first electrode and third electrode, respectively.

5. A device according to claim 1, wherein said first potential difference is substantially equal to said second potential difference.

6. A device according to claim 1, wherein said first potential difference between 1 and 20 V.

7. A device according to claim 1, wherein said first electrochromic element is electrochemically reacted to a first extent, such that the color of said first electrochromic element is substantially altered at a first instance in time, and wherein said second electrochromic element is electrochemically reacted to a same extent at a later second instance in time.

8. A device according to claim 7, wherein the time difference between said first and second instance of time is at least 500 milliseconds.

9. A device according to claim 1, wherein the potential drop between said interface and said third electrode is at least 10 times higher than the potential drop between said interface and said first electrode.

10. A device according to claim 1, wherein said elements are arranged as layers on a substrate in a common plane.

11. A device according to claim 1, wherein said at least one resistance device is formed of solidified electrolyte, arranged between said second electrochromic element and said interface.

12. A device according to claim 1, wherein said first electrochromic element is arranged between said second electrochromic element and said counter elements.

13. A device according to claim 12, wherein said first electrochromic element separates said second electrochromic element from said counter elements.

14. A device according to claim 13, wherein said first electrochromic element embraces said second electrochromic element.

15. A device according to claim 1, wherein said first electrochromic element at least partially circumscribes said second electrochromic element.

16. A device according to claim 1, wherein said first and second portions of solidified electrolyte form a continuous layer, which ionically connects said second electrochromic element and said second counter element.

17. A device according to claim 1, wherein said first and second counter elements form a continuous layer.

18. A device according to claim 1, wherein said first and second electrodes are one and the same.

19. A device according to claim 1, wherein said first electrochromic element is arranged as a first symbol which embraces said second electrochromic element.

20. A device according to claim 1, wherein said first and second portions of electrolyte are ionically separated from each other.

21. A device according to claim 1, wherein said at least one resistance device is arranged between said first electrochromic material and said fourth electrode, and between said second counter element and said fourth electrode.

22. A device according to claim 1, wherein said first and second counter elements are electronically separated from each other.

23. A device according to claim 1, wherein at least one of said first and second electrochromic layers further comprises an electrochromic delay portion.

24. A device according to claim 1, wherein the potential drop between said interface and said third electrode is at least 100 times higher than the potential drop between said interface and said first electrode.

25. An electrochromic device comprising:
first pixel having a first electrochromic layer and a first counter layer electronically separated from each other, and a first solidified electrolyte, which ionically connects said first electrochromic layer and said first counter layer, wherein said first counter layer is electronically connected to a first gate electrode and said first electrochromic layer electronically connects a first source electrode to a first drain electrode, and further comprises a switch portion arranged electronically between said source electrode and said drain electrode, the switch portion being in direct ionic contact with said solidified electrolyte;
second pixel having a second electrochromic layer and a second counter layer, electronically separated from each other, and a second solidified electrolyte, which ionically connects said second electrochromic layer and said second counter layer, wherein said second counter layer is electronically connected to a second gate electrode and said second electrochromic layer electronically connects a second source electrode to a second drain electrode;
at least one resistance device arranged between and electrically connected to a first contact portion and a second contact portion,
wherein said first drain electrode is connected to said second gate electrode and wherein both said first and second drain electrodes are connected to said first contact portion of said at least one resistance device, wherein said source and gate electrodes of said first pixel are arranged to receive and maintain a first potential difference, wherein said source electrode of said second pixel and said second contact portion of said at least one resistance device are arranged to receive and maintain a second potential difference, wherein said at least one resistance device and said voltage differences are arranged such that in an initial state of said pixel, the potential drop is relatively lower between said first source and drain electrodes as compared to across said at least one resistance device, such that in an inactive state of said first switch portion said first electrochromic layer is electrochemically reacted at a higher rate compared to said second electrochromic layer, and wherein the electrochemical reaction changes a color and relatively increases a resistance of said first switch portion, such that a flow of charge carriers between said second gate electrode and said second source electrode increases, such that in an active state of said first switch portion said second electrochromic material is electrochemical reacted at a relatively higher rate as compared to in said active state of said first switch portion, the electrochemical reaction changing a color of said second electrochromic material.

26. An electrochromic device according to claim 25, wherein said first pixel further comprises a delay reservoir comprising electrochromic and electrochemically active material, electronically connected to said first switch portion and arranged electrically between said first counter portion and said first switch portion such that said first electrolyte ionically connects both said switch portion and said delay reservoir to said first counter portion, and wherein a potential difference initiates an electrochemical reaction between said delay reservoir and said first counter portion, and wherein said first pixel further comprises means for maintaining a potential difference between said first switch portion and said first counter portion such that a front of said electrochemical reaction propagates in said delay reservoir until said front reaches said first switch channel, whereafter said electrochemical reaction alters the electrical conductivity of said switch channel such that the resistance between said first source and drain electrodes is relatively increased.

27. An electrochromic device according to claim 25, wherein said second electrochromic layer further comprises a switch portion arranged electronically between said second source electrode and said second drain electrode, the switch portion being in direct ionic contact with said second solidified electrolyte.

28. An electrochromic device according to claim 25, wherein said delay reservoir is arranged as a protrusion extending from said switch portion, the protrusion separating said switch portion from said counter portion.

29. An electrochromic device according to claim 28, wherein said delay reservoir is formed as a symbol.

30. An electrochromic device according to claim 29, wherein said first counter portion embraces said first switch portion.

31. An electrochromic device according to claim 25, wherein the electrochromic layer connecting said source electrode and said drain electrode has an elongated shape.

32. An electrochromic device according to claim 24, wherein said first delay reservoir is formed as a first symbol, the first symbol embracing said second electrochromic material.

33. An electrochromic device comprising:
a first electrochromic layer portion and a second electrochromic layer portion arranged of electrochemically active material;
at least one isolating device arranged between said first and second electrochromic layer portion;
a counter layer portion of electrochemically active material, wherein said first electrochromic layer portion is arranged spatially between said counter layer portion and said second electrochromic layer portion, such that said counter layer portion is spatially separated from said second electrochromic layer portion; and
a layer of solidified electrolyte ionically connecting said counter layer portion to both said first and second electrochromic layer portions, wherein both said first and second electrochromic portions are arranged to receive substantially the same first potential and said counter layer portion is arranged to receive a substantially different second potential, such that an electrochemical reaction is initiated which alters a color and relatively increases resistance of said first electrochromic material, before said second electrochromic material is altered to a same extent.

34. An electrochromic device according to claim 33, wherein said first electrochromic portion embraces said second electrochromic portion, such that said counter layer portion is spatially separated from said electrochromic layer portion.

35. An electrochromic device according to claim 33, wherein said counter layer portion embraces said first electrochromic layer.

36. An electrochromic device according to claim 33, wherein said electrochromic layers each are arranged as a symbol.

37. An electrochromic device according to claim 32, wherein said counter layer portion and said first and second electrochromic layer portions are separated from each other by lines of over-oxidized electrochemically active material.

38. An electrochromic device according to claim 33, wherein said solidified electrolyte is a continuous layer of solidified electrolyte.

* * * * *